US011251689B2

United States Patent
Bai et al.

(10) Patent No.: US 11,251,689 B2
(45) Date of Patent: Feb. 15, 2022

(54) MAGNETICALLY RECONFIGURABLE ROBOT JOINT MOTOR

(71) Applicant: HUAZHONG UNIVERSITY OF SCIENCE AND TECHNOLOGY, Hubei (CN)

(72) Inventors: Kun Bai, Hubei (CN); Lang Zhu, Hubei (CN); Mi Yuan, Hubei (CN); Kok-Meng Lee, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 22 days.

(21) Appl. No.: 16/961,934

(22) PCT Filed: Apr. 28, 2019

(86) PCT No.: PCT/CN2019/084717
§ 371 (c)(1),
(2) Date: Jul. 14, 2020

(87) PCT Pub. No.: WO2019/196960
PCT Pub. Date: Oct. 17, 2019

(65) Prior Publication Data
US 2020/0343799 A1 Oct. 29, 2020

(30) Foreign Application Priority Data
Apr. 13, 2018 (CN) .......................... 201810331770.2

(51) Int. Cl.
*H02K 16/04* (2006.01)
*H02K 21/02* (2006.01)
*B25J 9/12* (2006.01)

(52) U.S. Cl.
CPC ............ *H02K 21/029* (2013.01); *B25J 9/126* (2013.01); *H02K 2213/09* (2013.01)

(58) Field of Classification Search
CPC ...... H02K 16/04; H02K 11/094; H02K 1/223; H02K 11/0094
See application file for complete search history.

(56) References Cited

U.S. PATENT DOCUMENTS 6,459,185 B1 * 10/2002 Ehrhart .................... H02K 1/20
310/156.35
6,531,798 B1 * 3/2003 Palmero .............. F16H 25/2018
310/112

(Continued)

OTHER PUBLICATIONS

"International Search Report (Form PCT/ISA/210) of PCT/CN2019/084717", dated Jul. 31, 2019, with English translation thereof, pp. 1-4.

(Continued)

*Primary Examiner* — Dang D Le
(74) *Attorney, Agent, or Firm* — JCIP Global Inc.

(57) ABSTRACT

A magnetically reconfigurable robot joint motor includes a coil stator, a permanent magnet rotor and a magnetic reconfiguration unit. The magnetic reconfiguration unit is arranged around an outer periphery of the permanent magnet rotor, and a coil connected to a control circuit is wound on an outer layer of the magnetic reconfiguration unit. When it is necessary to execute low rotation speed or zero rotation speed operating conditions, the control circuit inputs current pulses of different strengths, so that the magnetic reconfiguration unit obtains permanent magnetization of corresponding degree, and generates a magnetic field which acts together with a magnetic field of the permanent magnet rotor, so as to maintain a torque required for output.

2 Claims, 1 Drawing Sheet

(56) References Cited

U.S. PATENT DOCUMENTS

| | | | | |
|---|---|---|---|---|
| 7,336,012 B2* | 2/2008 | Tanaka | ............ | B82Y 10/00 |
| | | | | 310/112 |
| 7,791,242 B2* | 9/2010 | Bojiuc | ............ | H02K 21/38 |
| | | | | 310/200 |
| 9,006,949 B2* | 4/2015 | Kusase | ............ | H02K 1/16 |
| | | | | 310/112 |

OTHER PUBLICATIONS

Bai Kun, et al., "Design concept development of a variable magnetization motor with improved efficiency and controllable stiffness for robotic applications," Science China Technological Sciences, vol. 62, Jan. 2019, pp. 39-46.

Sabrina Dallavalle, et al., "Design, synthesis, and evaluation of biphenyl-4-yl-acrylohydroxamic acid derivatives as histone deacetylase (HDAC) inhibitors," European Journal of Medicinal Chemistry, vol. 44, May 2009, pp. 1900-1912.

Raffaella Cincinelli, et al., "Influence of the adamantyl moiety on the activity of biphenylacrylohydroxamic acid-based HDAC inhibitors," European Journal of Medicinal Chemistry, vol. 79, May 2014, pp. 251-259.

* cited by examiner

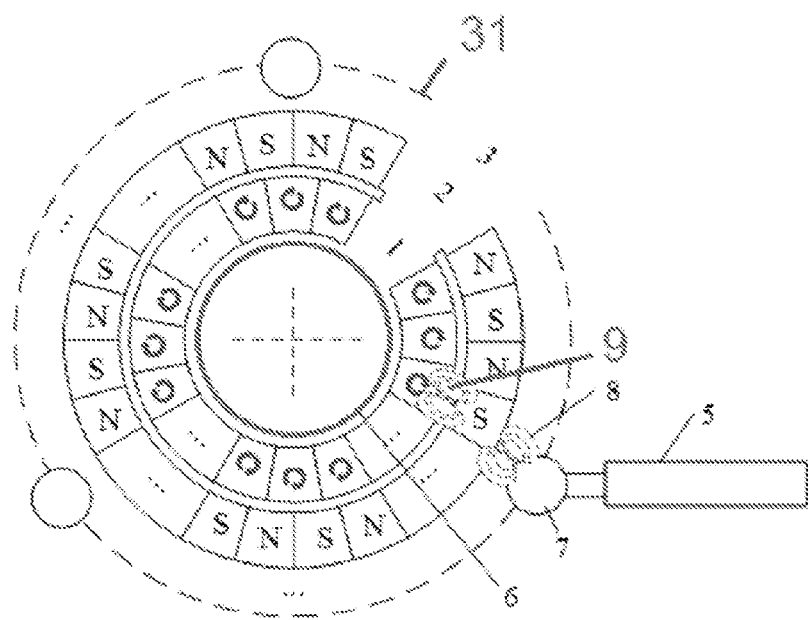

MAGNETICALLY RECONFIGURABLE ROBOT JOINT MOTOR

CROSS-REFERENCE TO RELATED APPLICATION

This application is a 371 of international application of PCT application Ser. No. PCT/CN2019/084717 filed on Apr. 28, 2019, which claims the priority benefit of China application no. 201810331770.2, filed on Apr. 13, 2018. The entirety of each of the above mentioned patent applications is hereby incorporated by reference herein and made a part of this specification.

BACKGROUND

Technical Field

The invention relates to the field of robot driving apparatuses, and more particularly, relates to a magnetically reconfigurable robot joint motor.

Description of Related Art

In robot systems, executing mechanisms are generally divided into two basic types including a hydraulic driving type and a motor driving type, of which the motor driving type is the most common. It is generally known that a conventional motor driver is formed by a stator, a rotor, and an output shaft. When working, a rotor coil inputs a current, and a coil magnetic field is thus generated. This magnetic field interacts with the permanent magnet stator, so as to drive the rotor to move and further control the robot to complete required various movements.

The research shows that when the rotor rotates, since the rotor rotates in the magnetic field, a counter electromotive force is generated. Further, when the rotation speed increases, the counter electromotive force grows. On the other hand, a motor voltage and the counter electromotive force together determine a magnitude of currents of the rotor coil. At a low rotation speed, because the speed of the stator and the rotor is relatively low, the generated counter electromotive force is minor, and a large motor current is thus generated. An excessive current may cause the motor to generate a large amount of Joule heat. Further, the efficiency of the motor may significantly decrease, resulting in considerable energy loss. In other words, as affected by the effect brought by the counter electromotive force, the motor is required to be at a higher speed to maintain high efficiency.

Nevertheless, in the field of robots and especially in the typical application scenarios of robot joint driving, in most cases, a torque is required to be outputted in the low rotation speed or zero rotation speed operating condition. In the solution adopted by the related art, a speed reduction shaft system such as a gear speed reduction mechanism is generally added between the motor and the output shaft to solve this problem. That is, a plurality of different reducers are combined to allow the motor to obtain different rated speeds and rotation speeds. Nevertheless, the following technical problems may inevitably occur. Firstly, the entire volume of the robot joint is increased, such that the driver becomes excessively large and complicated, and the joint may not be reversely-driven at the same time. Secondly, recoil may be easily introduced by the gear speed reduction mechanism, which increases the weight and causes problems such as inertia during collision. Lastly, in the conventional joint driving method, a large current is required to be inputted for maintaining the torque. Nevertheless, the coil may limit the magnitude of the current when the efficiency is considerably low, so that the driver is unable to output the required large torque at low speed. Correspondingly, further improvement is required to be designed to satisfy the requirement for high efficiency of modern robot joint driving.

SUMMARY

According to the above technical defects or improvement requirements of the related art, the invention provides a magnetically reconfigurable robot joint motor in which the entire structural layout is redesigned, a magnetic reconfiguration unit is provided, and specific configurations and working mechanisms of components are improved, so that high efficiency is obtained in both high and low rotation speeds, and a required torque is generated in a considerably low or zero rotation speed operating condition, so the magnetically reconfigurable robot joint motor may be particularly applied to application scenarios of robot joint direct driving.

To realize the above purpose, according to the invention, a magnetically reconfigurable robot joint motor is provided, and the magnetically reconfigurable robot joint motor includes a coil stator, a permanent magnet rotor and a magnetic reconfiguration unit.

The coil stator is disposed on a motor driver, and a magnetic field direction generated by the coil stator when being electrified is along a radial direction of the motor driver.

The permanent magnet rotor as a whole has a ring-shaped disk structure, is arranged around an outer periphery of the coil stator, and is formed by a plurality of permanent magnet blocks connected in series in sequence. Adjacent two of the permanent magnet blocks are configured to have opposite magnetic pole directions.

The magnetic reconfiguration unit continues to be arranged around an outer periphery of the permanent magnet rotor. The magnetic reconfiguration unit is made of a hard magnetic material, and a coil connected to a control circuit is wound on an outer layer of the magnetic reconfiguration unit. In this way, when a robot joint is required to execute a low rotation speed or zero rotation speed operating condition, the control circuit inputs current pulses of different strengths, so that the magnetic reconfiguration unit obtains permanent magnetizations of corresponding degree, and generates a magnetic field which acts together with a magnetic field of the permanent magnet rotor so as to maintain a torque required for output. When the robot joint is required to execute a high speed operating condition, the magnetic reconfiguration unit is kept in an initial state, which indicates that the control circuit does not input the current pulses or the control circuit inputs a predetermined current pulse, and the magnetic reconfiguration unit generates a magnetic field to perform fixed compensation on a static torque of the entire motor.

Preferably, when the robot joint is required to execute the low rotation speed or zero rotation speed operating condition, the motor mainly depends on the magnetic reconfiguration unit for outputting the torque. When the robot joint is required to execute the high speed operating condition, the motor mainly depends on the stator coil for outputting the torque.

To sum up, when the technical solution provided by the invention is compared to the existing art, in-depth study and analysis on actual operating conditions and motor direct driving mechanisms of the robot joint are provided, and a dedicated magnetic reconfiguration unit is arranged to work together with other components. Correspondingly, in high rotation speed, low rotation speed, and zero rotation speed operating conditions, the required torque and efficiency are precisely obtained. Further, easy operation is achieved, a compact structure is provided, high adaptability is accomplished, and each portion of the robot joint is highly integrated. Therefore, the magnetically reconfigurable robot joint motor provided by the invention is particularly suitable for scenarios of various robot joint driving applications that require high precision and high efficiency movement.

BRIEF DESCRIPTION OF THE DRAWINGS

FIG. 1 is a schematic diagram illustrating a basic structure of forming a magnetically reconfigurable robot joint motor according to an exemplary embodiment of the invention.

DESCRIPTION OF THE EMBODIMENTS

To better illustrate the goal, technical solutions, and advantages of the invention, the following embodiments accompanied with drawings are provided so that the invention are further described in detail. It should be understood that the specific embodiments described herein serve to explain the invention merely and are not used to limit the invention. In addition, the technical features involved in the various embodiments of the invention described below can be combined with each other as long as the technical features do not conflict with each other.

FIG. 1 is a schematic diagram illustrating a basic structure of forming a magnetically reconfigurable robot joint motor according to an exemplary embodiment of the invention. As shown in FIG. 1, the motor is configured to be applied to scenarios of joint driving applications of various robots and includes main components such as a coil stator 1, a permanent magnet rotor 2, and a magnetic reconfiguration unit 3. Detail description is provided one by one as follows.

As shown in FIG. 1, the coil stator 1 may be disposed on a motor driver 6, and a magnetic field direction generated by the coil stator 1 when being electrified is along a radial direction of the motor driver 6, so that a coil magnetic field may act on the permanent magnet rotor 2 in a favorable manner. In addition, a magnitude of a current in the coil stator 1 determines a magnitude of a torque acting on the permanent magnet rotor to some extent.

The permanent magnet rotor 2 as a whole preferably has a ring-shaped disk structure, is arranged around an outer periphery of the coil stator 1, and is formed by a plurality of permanent magnet blocks connected in series in sequence. Adjacent two of the permanent magnet blocks are configured to have opposite magnetic pole directions. Besides, the permanent magnet rotor is fixedly connected to an output shaft.

The key improvement provided by the invention lies in that the magnetic reconfiguration unit 3 continues to be arranged around an outer periphery of the permanent magnet rotor 2, and the magnetic reconfiguration unit 3 is made of a hard magnetic material. One layer of coil 7 connected to a control circuit 5 is wound on an outer layer 31 of the magnetic reconfiguration unit 3. In this way, when a robot joint is required to execute a low rotation speed or zero rotation speed operating condition, the control circuit 5 inputs current pulses of different strengths, so that the magnetic reconfiguration unit 3 obtains permanent magnetization of corresponding degree, and generates a magnetic field 8 which acts together with a magnetic field 9 of the permanent magnet rotor 2, so as to maintain a torque required for output. High efficiency is maintained as well. When the robot joint is required to execute a high speed operating condition, the magnetic reconfiguration unit 3 is kept in an initial state, which indicates that the control circuit 5 does not input the current pulses or the control circuit 5 inputs a predetermined current pulse, and the magnetic reconfiguration unit 3 generates magnetic field 8 to perform fixed compensation on a static torque of the entire motor.

Specific description of operation principles of the robot joint motor of the invention is provided as follows.

When a driver is applied to the high speed operating condition, the operation process of the motor is basically similar to that of a conventional motor. In this case, the stator coil may output a torque and maintains high efficiency. The magnetic reconfiguration unit is powered off, that is, no magnetization occurs. It is also indicated that joint driving is performed based mainly on torque output performed by the stator coil. Nevertheless, according to a preferred embodiment of the invention, a predetermined current pulse may also be inputted, and fixed compensation may be correspondingly performed on a static torque (e.g., a gravity torque, etc.). Motor efficiency may be enhanced to a certain extent through this manner as shown in a number of actual testing. For instance, a current driving the coil may be calculated through a given torque. The current is then applied by a control system. Correspondingly, fixed compensation may be performed on the static torque to further enhance motor efficiency.

When the driver is applied to a low speed operating condition (this operating condition is common for robot joint movement), in the motor, the torque is outputted mainly by the magnetic reconfiguration unit. That is, after the control circuit applies a current pulse of certain strength to the magnetic reconfiguration unit, a magnetic field generated by the current may set the permanent magnet rotor to be permanently magnetized. This magnetic field interacts with the permanent magnet rotor and plays a major role, such that the motor as a whole may still maintain the required torque at a low speed while maintaining high motor efficiency. More specifically, in actual use, when the rotor rotates, a magnetization strength required by the magnetic reconfiguration unit may be calculated according to a rotor position and a torque required by the rotation. A pulse current is then applied to the magnetized coil through the control system to magnetize the magnetic reconfiguration unit.

Even when the driver is applied to the zero rotation speed operating condition, since the magnetic reconfiguration unit is made of a hard magnetic material, residual magnetism generated by the current pulse is maintained for a considerable period of time even though the current pulse in the coil is temporary. As such, the required torque is generated between the magnetic reconfiguration unit and the permanent magnet rotor, and no other currents are continuously inputted. Correspondingly, as long as pulses are periodically applied to the coil of the magnetic reconfiguration unit according to changes of the rotation speed, the torque required for driving the robot joint may be maintained.

In view of the foregoing, in the above technical solution, a compact structure is provided, easy operation is achieved, and transformation of existing robot joints may be easily performed. Further, regardless of the high speed or low speed operating condition, high motor efficiency is obtained while maintaining output of an expected torque. Therefore, the magnetically reconfigurable robot joint motor provided by the invention is particularly suitable for scenarios of various robot joint driving applications that require high precision and high efficiency movement.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A magnetically reconfigurable robot joint motor, the robot joint motor comprising a coil stator, a permanent magnet rotor, and a magnetic reconfiguration unit, wherein
the coil stator is disposed on a motor stator, a magnetic field direction generated by the coil stator when being electrified is along a radial direction of the motor stator, the permanent magnet rotor as a whole has a ring-shaped disk structure, is arranged around an outer periphery of the coil stator, and is formed by a plurality of permanent magnet blocks connected in series in sequence, and adjacent two of the permanent magnet blocks are configured to have opposite magnetic pole directions, and
the magnetic reconfiguration unit continues to be arranged around an outer periphery of the permanent magnet rotor, the magnetic reconfiguration unit is made of a hard magnetic material, a coil connected to a control circuit is wound on an outer layer of the magnetic reconfiguration unit, in this way, when a low rotation speed or zero rotation speed operating condition is required to be executed, the control circuit inputs current pulses of different strengths, so that the magnetic reconfiguration unit obtains permanent magnetization of corresponding degree, and generates a magnetic field which acts together with a magnetic field of the permanent magnet rotor so as to maintain a torque required for output; when a high speed operating condition is required to be executed, the magnetic reconfiguration unit is kept in an initial state, which indicates that the control circuit does not input the current pulses or the control circuit inputs a predetermined current pulse, and the magnetic reconfiguration unit generates a magnetic field to perform fixed compensation on a static torque of the entire robot joint motor.

2. The magnetically reconfigurable robot joint motor according to claim 1, wherein when the robot joint is required to execute the low rotation speed or zero rotation speed operating condition, the robot joint motor mainly depends on the magnetic reconfiguration unit for outputting the torque, and when the high speed operating condition is required to be executed, the robot joint motor mainly depends on the a stator coil for outputting the torque.

* * * * *